US012423244B2

(12) United States Patent
Benisty et al.

(10) Patent No.: US 12,423,244 B2
(45) Date of Patent: Sep. 23, 2025

(54) HYBRID ADDRESS TRANSLATION CACHE USING DRAM

(71) Applicant: Sandisk Technologies, Inc., Milpitas, CA (US)

(72) Inventors: Shay Benisty, Beer Sheva (IL); Ariel Navon, Revava (IL); Judah Gamliel Hahn, Ofra (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/503,656

(22) Filed: Nov. 7, 2023

(65) Prior Publication Data

US 2025/0147894 A1    May 8, 2025

(51) Int. Cl.
*G06F 12/10* (2016.01)
*G06F 12/123* (2016.01)

(52) U.S. Cl.
CPC ............ *G06F 12/10* (2013.01); *G06F 12/123* (2013.01)

(58) Field of Classification Search
None
See application file for complete search history.

(56) References Cited

U.S. PATENT DOCUMENTS

| | | | |
|---|---|---|---|
| 10,929,310 B2 | 2/2021 | Borikar et al. | |
| 11,263,147 B2 | 3/2022 | Miura | |
| 11,422,944 B2 | 8/2022 | Guo et al. | |
| 11,526,451 B2 | 12/2022 | Koufaty et al. | |
| 12,277,061 B2 | 4/2025 | Benisty et al. | |
| 2018/0074757 A1 | 3/2018 | Yamaguchi et al. | |
| 2019/0227943 A1 | 7/2019 | Chen | |
| 2021/0390179 A1* | 12/2021 | Hahn | G06F 21/71 |
| 2021/0406199 A1 | 12/2021 | Kounavis et al. | |
| 2022/0206976 A1 | 6/2022 | Ng et al. | |
| 2022/0261178 A1* | 8/2022 | He | G06F 12/1027 |
| 2023/0153021 A1* | 5/2023 | Hiramoto | G06F 3/0655 |
| | | | 711/154 |
| 2023/0176978 A1 | 6/2023 | Chin et al. | |
| 2023/0325321 A1* | 10/2023 | Helmick | G06F 3/061 |
| 2023/0333990 A1 | 10/2023 | Helmick et al. | |

(Continued)

FOREIGN PATENT DOCUMENTS

CN       115185733 A       10/2022

*Primary Examiner* — Edward J Dudek, Jr.
*Assistant Examiner* — Ralph A Verderamo, III
(74) *Attorney, Agent, or Firm* — Patterson + Sheridan, LLP

(57) ABSTRACT

Splitting an address translation cache (ATC) into two portions can reduce costs and maintain efficient retrieval of data. One portion can be disposed in a first location while a second portion can be disposed in a second location distinct from the first location. The first location can be in the controller. The second location can be in a host memory buffer (HMB) or in a memory device separate from the controller. To obtain translated addresses, untranslated addresses can be searched in the first portion and the corresponding translated addresses can be retrieved from the second portion. When invalidating untranslated addresses, the untranslated addresses of the first portion can be deleted without a need to delete corresponding translated addresses in the second portion. To improve ATC storage capacity, grouping of untranslated addresses is possible using most significant bytes (MSBs).

19 Claims, 10 Drawing Sheets

(56) References Cited

U.S. PATENT DOCUMENTS

| | | |
|---|---|---|
| 2023/0359392 A1 | 11/2023 | Singh et al. |
| 2023/0376422 A1 | 11/2023 | Watanabe |
| 2023/0409487 A1* | 12/2023 | Sandberg ............ G06F 12/0802 |
| 2024/0143515 A1 | 5/2024 | Chakrabarty et al. |
| 2024/0273033 A1* | 8/2024 | Montero ............. G06F 12/1027 |

* cited by examiner

HYBRID ADDRESS TRANSLATION CACHE USING DRAM

BACKGROUND OF THE DISCLOSURE

Field of the Disclosure

Embodiments of the present disclosure generally relate to improved address translation.

Description of the Related Art

One of the use cases of a multi-tenancy device is where the solid-state drive (SSD) is shared across multiple tenants (i.e. virtual memories (VMs)) without any hypervisor layer between the SSD and the VM. There are a variety of optimizations around memory usage that will be done when the host operating system (OS) (e.g. Windows Server) implements page movement capabilities. The capabilities require address translation service (ATS) and Page Request Interface (PRI) functionality in any peripheral component interconnect express (PCIe) device that is directly accessed by guest VMs. Moving memory pages implies the device will receive PCIe addresses that need to be translated.

The primary driver for ATS and PRI in the drive is to get address translation cache (ATC) hits within a single 4 k input/output (IO) command. In some cases, 4 k IO commands (e.g. NVMe Write which means PCIe DMA read) will be broken up into smaller direct memory access (DMA) pieces based on the PCIe max read request size (MRRS). Generally the MRRS is 512-bytes or max 1024-bytes. For example when a device wants to read 4 KB of contiguous data from the host, the device needs to break the request to 8 PCIe transactions while the size of each is 512-bytes. Within a single 4 k IO command, expect to get four times or eight times the reduction in ATS requests due to the drive having the ATS/ATC.

The ATC feature is very expensive since ATC requires a huge memory to be used as the cache buffer (in the order of few megabytes (MBs)) and high-performance look up operations. ATC significantly increases the area, cost and power consumption of the device. The direct method for supporting ATS/PRI functionality is by implementing a real cache for ATC as defined in PCIe standard. The previous approach is inefficient and leads to expensive solution that consumes more power while having even less performance.

There is a need in the art for improved address translation.

SUMMARY OF THE DISCLOSURE

Splitting an address translation cache (ATC) into two portions can reduce costs and maintain efficient retrieval of data. One portion can be disposed in a first location while a second portion can be disposed in a second location distinct from the first location. The first location can be in the controller. The second location can be in a host memory buffer (HMB) or in a memory device separate from the controller. To obtain translated addresses, untranslated addresses can be searched in the first portion and the corresponding translated addresses can be retrieved from the second portion. When invalidating untranslated addresses, the untranslated addresses of the first portion can be deleted without a need to delete corresponding translated addresses in the second portion. To improve ATC storage capacity, grouping of untranslated addresses is possible using most significant bytes (MSBs).

In one embodiment, a data storage device comprises: a memory device; and a controller coupled to the memory device, wherein the controller is configured to: obtain a translation of an untranslated address; store the untranslated address in a first location of an address translation cache (ATC); and store the translated address in a second location of the ATC, wherein the first location is separate and distinct from the second location.

In another embodiment, a data storage device comprises: a memory device; and a controller coupled to the memory device, wherein the controller is configured to: determine that address translation service (ATS) is needed for an untranslated address; search a first portion of an address translation cache (ATC) for the untranslated address; determine whether there is a match for the untranslated address in the first portion of the ATC; and search a second portion of the ATC for a translated address corresponding to the untranslated address.

In another embodiment, a data storage device comprises: means to store data; and a controller coupled to the means to store data, wherein the controller is configured to: store and retrieve an untranslated address from a first portion of an address translation cache (ATC); and store and retrieve a corresponding translated address from a second portion of the ATC, wherein the first portion and the second portions are distinct locations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Splitting an address translation cache (ATC) into two portions can reduce costs and maintain efficient retrieval of data. One portion can be disposed in a first location while a second portion can be disposed in a second location distinct from the first location. The first location can be in the controller. The second location can be in a host memory buffer (HMB) or in a memory device separate from the controller. To obtain translated addresses, untranslated addresses can be searched in the first portion and the corresponding translated addresses can be retrieved from the second portion. When invalidating untranslated addresses, the untranslated addresses of the first portion can be deleted without a need to delete corresponding translated addresses in the second portion. To improve ATC storage capacity, grouping of untranslated addresses is possible using most significant bytes (MSBs).

Figure 1:
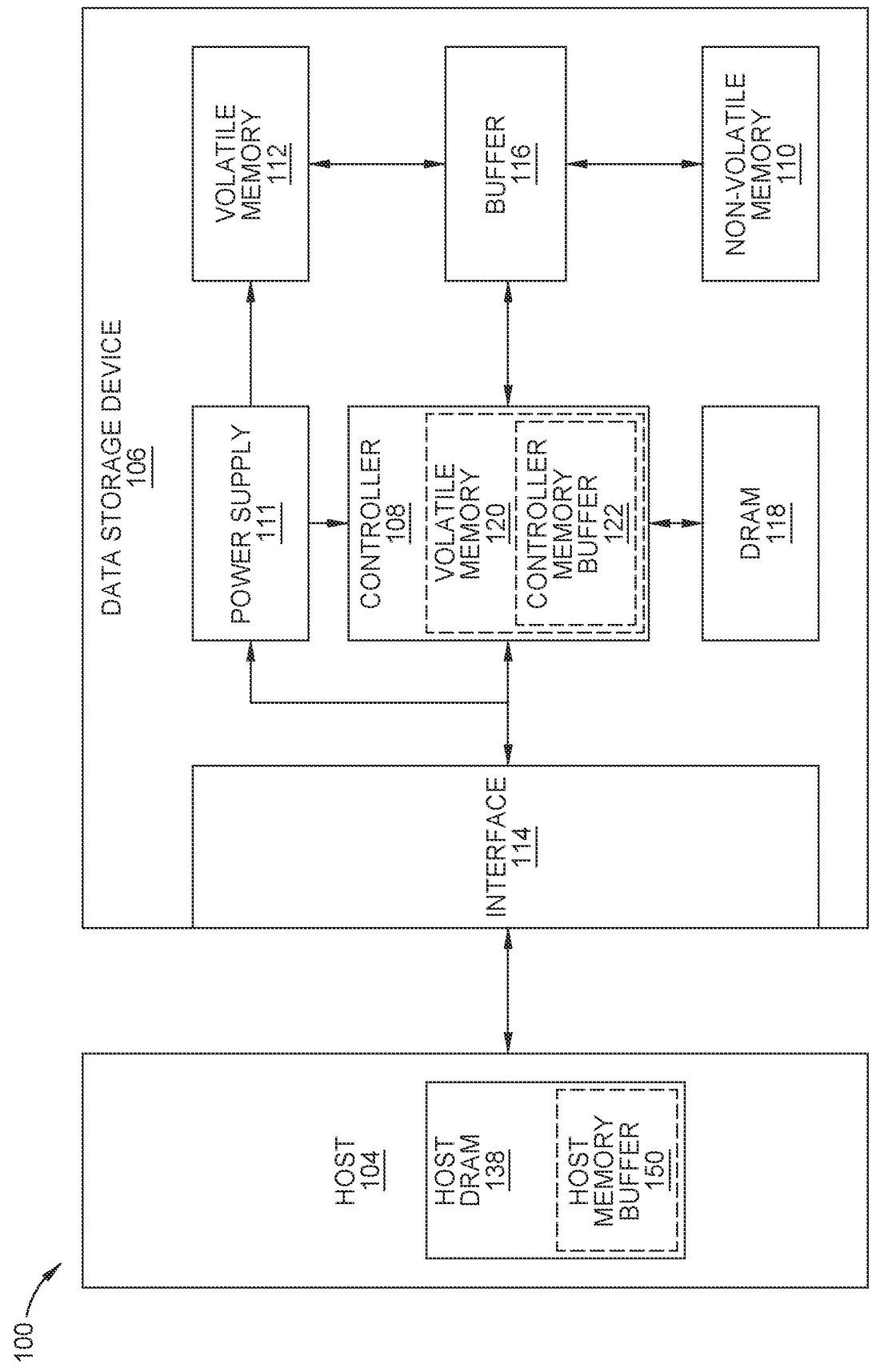
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
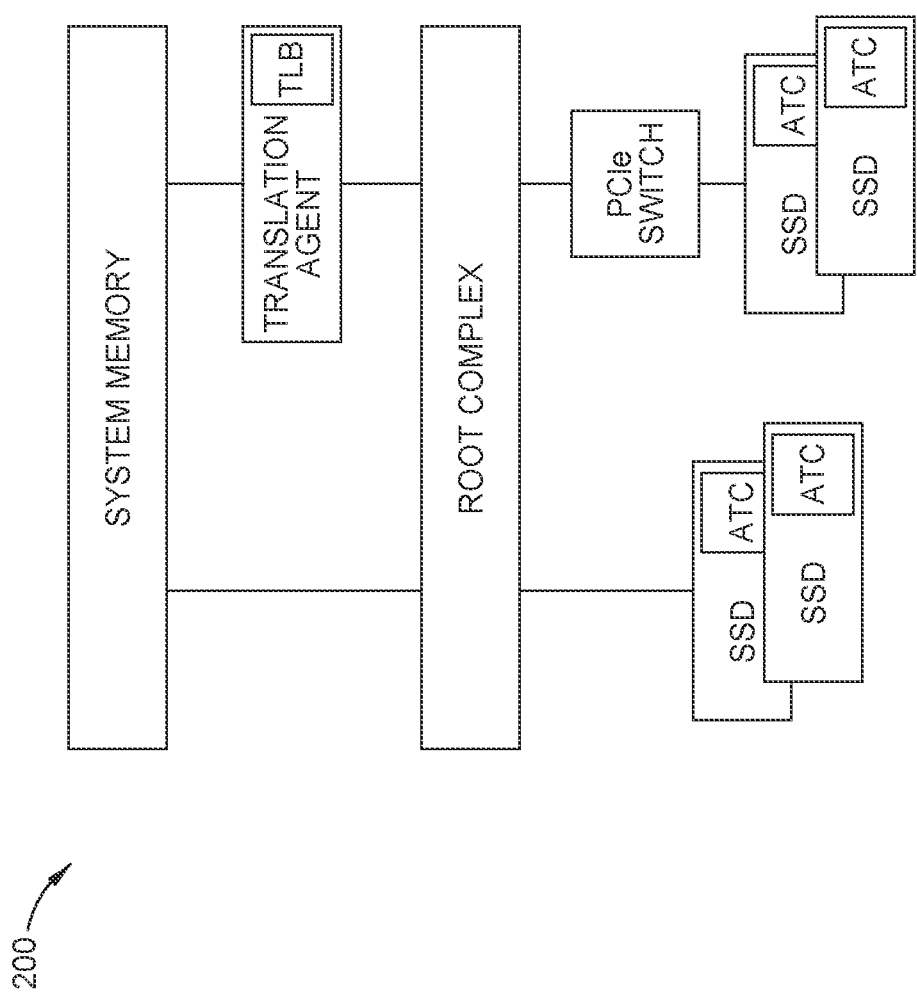
FIG. 2 is a schematic diagram illustrating a multi-tenancy system supporting ATS functionality, according to certain embodiments.

FIG. 2 is a schematic diagram illustrating a multi-tenancy system 200 supporting ATS functionality, according to certain embodiments. A translation agent (TA) services memory translation requests within the TA. Within the TA, the ATC is referred to as a translation look-aside buffer (TLB) in the TA. When the ATS enabled SSD device accesses system memory, the SSD shall cache translated addresses in an internal ATC. The ATC is different from the TLB translation cache used by the host. When the ATS enabled SSD device shall implement and maintain a designated ATC to minimize performance dependencies on the TA and alleviate TA resource pressure.

In one embodiment, all the addresses provided over PCIe are virtual addresses that are untranslated address. Translations must be done before using the virtual addresses. The device receives the commands and then takes the PRP and all addresses provided by the host. The SSD device passes the specific address request to the TA. The TA is a part of the host. The TA will receive the request and the virtual addresses from the SSD device to get translated. As a response, the SSD device will receive back the translated addresses. The device now will be able to issue memory read and memory write requests using the translated addresses. The translated addresses will then be forwarded to the system memory.

The PCIe standard defines the ATC. The ATC is a cache buffer in the SSD. Using the cache buffer, the SDD is allowed to cache some address translation in the ATC. Whenever an SSD gets a command and then gets the PRP first, the SSD will do some lookup over the internal ATC. Only if the SSD finds a match the SSD will use the translated address stored in the ATC. Otherwise the SSD will interact with the TLB.

Examples of PCIe addresses to be translated include: caching of submission queue (SQ) and completion queue (CQ) address ranges; SQ entry decoding including standard decoding of the data pointer for read or write that submit translation requests immediately, PRPs and SGLs that decode the data pointers and follow linked lists and upper bound of translations per large commands equal a rate match PRI translations with Gen5 bandwidth (BW) maximums, and DIX translation requests for metadata pointers and associated linked lists of addresses.

Figure 3:
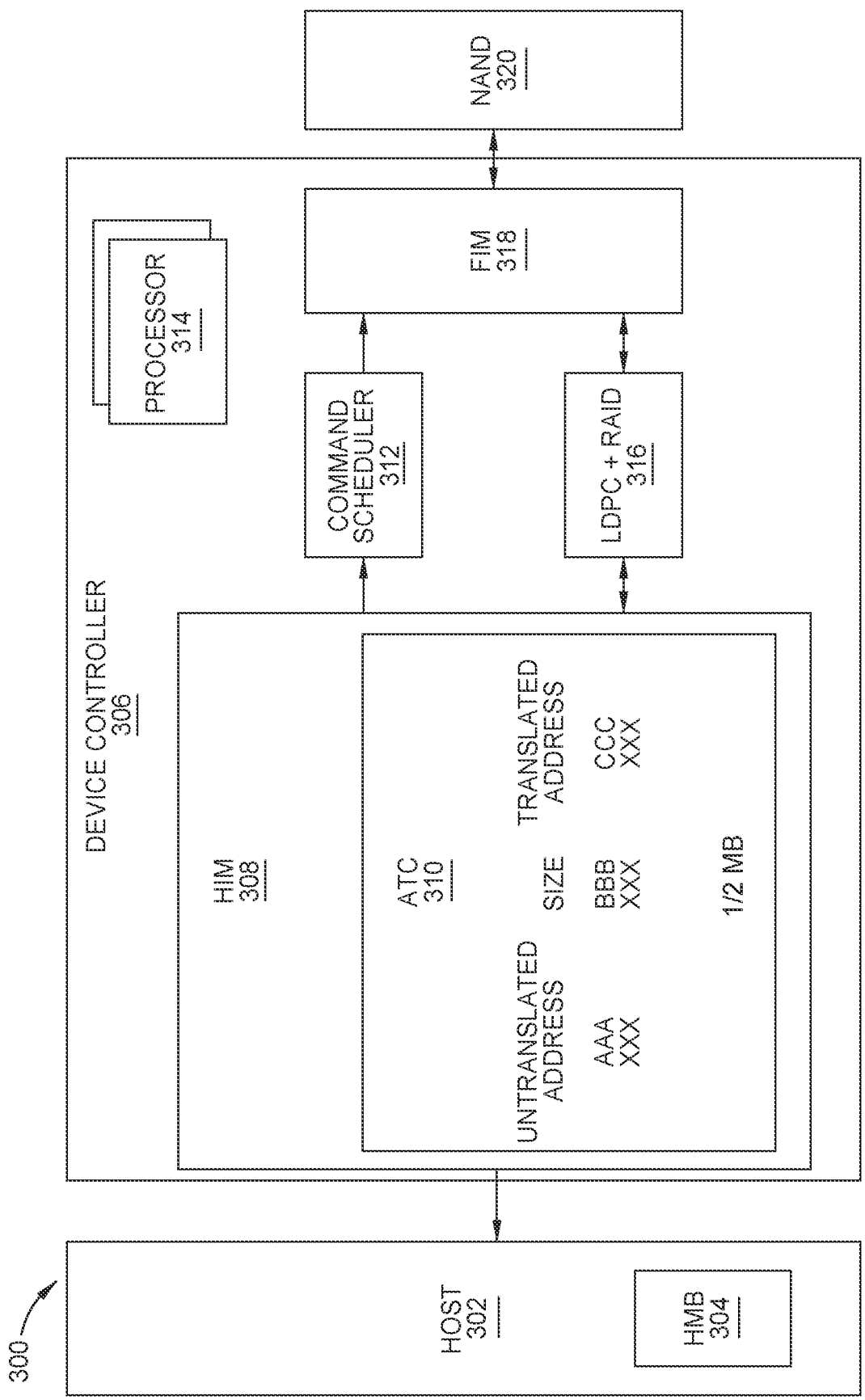
FIG. 3 is a schematic diagram illustration of an ATS memory device system, according to one embodiment.

FIG. 3 is a schematic diagram illustration of an ATS memory device system 300 that supports an ATC 310 in the device controller 306, according to certain embodiments. The ATS memory device system 300 includes a host device 302, a device controller 306, and memory 320 (e.g., NAND). The host device 302 includes a HMB 304. The device controller 306 includes a host interface module (HIM) 308, a command scheduler 312, a low-density parity check and redundant array of independent drives (LDPC+RAID) component 316, one or more processors 314, and a flash interface module (FIM) 318. The HIM 308 includes the ATC 310.

The ATC 310 contains a table of entries (~1 MB) that hold the parameters required for caching. The parameters include untranslated addresses, size, and translated addresses. When the device controller 306 receives a request for address translation, the device controller 306 first scans the untranslated addresses stored in the ATC 310 trying to find a match. If a match is found, the corresponding translated addresses are taken from entries in the ATC 310. If a match is not found, the device controller accesses the TA in order to retrieve the address translation. The ATC 310 may be updated by removing one entry and storing a new address translation entry.

In certain embodiments, the ATC is split into two parts. A first part of the ATC holds all untranslated cached addresses and their sizes, while a second part of the ATC holds the corresponding translated addresses. The first part of the ATC may perform at low latency due to the required look up operations. While the second part of the ATC may have some relaxation in latency requirements. As a result, the first part of the ATC may reside in an internal memory location (i.e., SRAM) in the device controller, while the second part of the ATC may reside in an external memory location (i.e., DRAM or HMB). When receiving an ATS request, the device controller accesses the first part of the ATC multiple times to find the matching address. However, the second part of the ATC is accessed only once per ATS request, and only in a "hit" scenario. When the device controller finds the matching untranslated address in the first part of the ATC, it is considered a "hit." In that manner, the size of the ATC is dramatically reduced, while performance requirements remain fulfilled.

Figure 4:
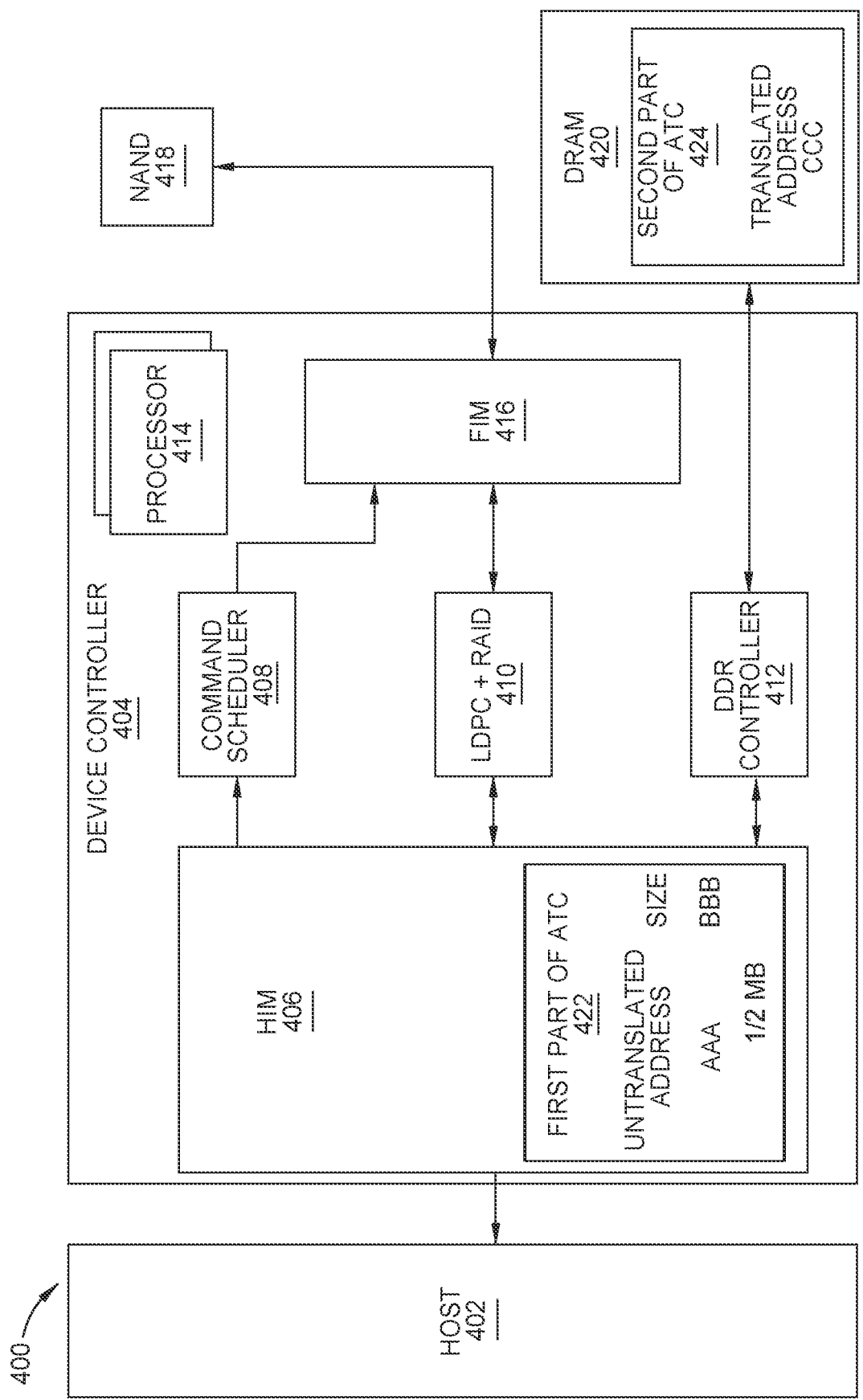
FIG. 4 is a schematic diagram illustration of an ATS memory device system, according to another embodiment.

FIG. 4 is a schematic diagram illustration of an ATS memory device system 400 where the ATC is split between two memory locations (i.e., SRAM and embedded DRAM), according to certain embodiments. The ATS memory device system 400 includes a host device 402, a device controller 404, memory (e.g., NAND) 418, and external DRAM 420. The DRAM is 'external' to the controller. Stated another way, the DRAM is disposed outside of the controller The device controller 404 includes a HIM 406, a command scheduler 408, a LDPC+RAID component 410, a double data rate (DDR) controller 412, a processor 414, and a FIM 416. The HIM 406 contains the first part of the ATC 422. The external DRAM 420 contains the second part of the ATC 424.

The first part of the ATC 422 holds the untranslated addresses and corresponding sizes. The first part of the ATC 422 may also be implemented internally in SRAM where internally means a part of the controller. The second part of the ATC 424 holds the corresponding translated addresses while keeping the structure aligned with the first part of the ATC 422. The second part of the ATC 424 may further be implemented in external DRAM 420. Single large RAM is expensive and results in higher power consumption of the memory device. Splitting the ATC into two parts and storing each part in separate and distinct locations saves costs because it removes the need for a single large RAM. Instead, by splitting the ATC into two parts, the memory storage device where each part of the ATC is stored is smaller than if the ATC were stored on a single RAM. The elimination of the need for a single large RAM reduces total costs and power consumption.

When getting address translation requests, the device controller 404 accesses the first part of the ATC 422 multiple times to find the matching address. When the device controller 404 finds a matching address, it is considered a "hit." In a "hit" scenario, the second part of the ATC 424 is accessed once to retrieve the corresponding translated address.

Figure 5:
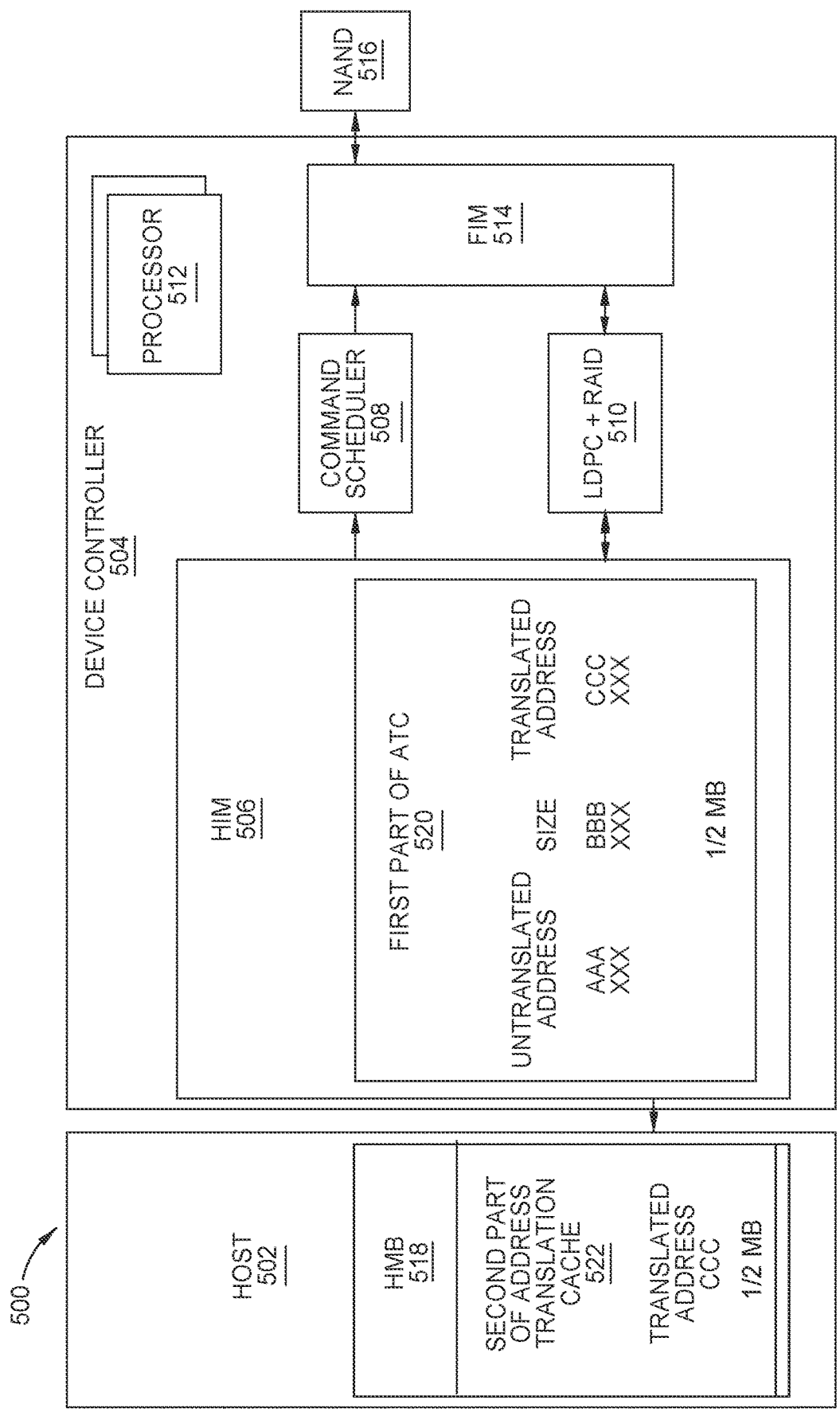
FIG. 5 is a schematic diagram illustration of an ATS memory device system, according to another embodiment.

FIG. 5 is a schematic diagram illustration of an ATS memory device system 500 where the ATC is split between SRAM and a HMB, according to certain embodiments. The ATS memory device system 500 includes a host device 502, a device controller 504, and memory 516 (e.g., NAND). The host device includes the HMB 518. The device controller 504 includes a HIM 506, a command scheduler 508, a LDPC+RAID component 510, a processor 512, and a FIM 514.

The first part of the ATC 520 holds the untranslated addresses and their sizes. The second part of the ATC 522 holds the translated addresses while keeping the structure aligned with the first part of the ATC 520. When getting address translation requests, the device controller 504 accesses the first part of the ATC 520 to perform a look up operation where the first part of the ATC 520 is accessed multiple times to find the matching untranslated address. When the device controller 504 finds the matching untranslated address, it is considered a "hit." Only in a "hit" scenario is the second part of the ATC 522 stored in the HMB 518 is accessed. Further, the second part of the ATC 522 is accessed only once to retrieve the corresponding translated address. While the second part of the ATC 522 stored in the HMB 518 is being accessed to retrieve the corresponding translated address, the first part of the ATC 520 may implement another search operation.

The first part of the ATC 520 must perform at low latency due to the required look up operations. However, the second part of the ATC 522 is permitted to have relaxed latency requirements because it is only accessed once per address translation request and only in a "hit" scenario. Accordingly, by implementing another search operation in the first part of the ATC 520 while the corresponding translated address is being fetched from the second part of the ATC 522 any latency created by the HMB 518 is negated. Thus, performance loss due to any latency in the HMB 518 is eliminated because the first part of the ATC 520 prepares the translated address to the second part of the ATC 522 ahead of time by implementing another search operation after a "hit" scenario.

Figure 6:
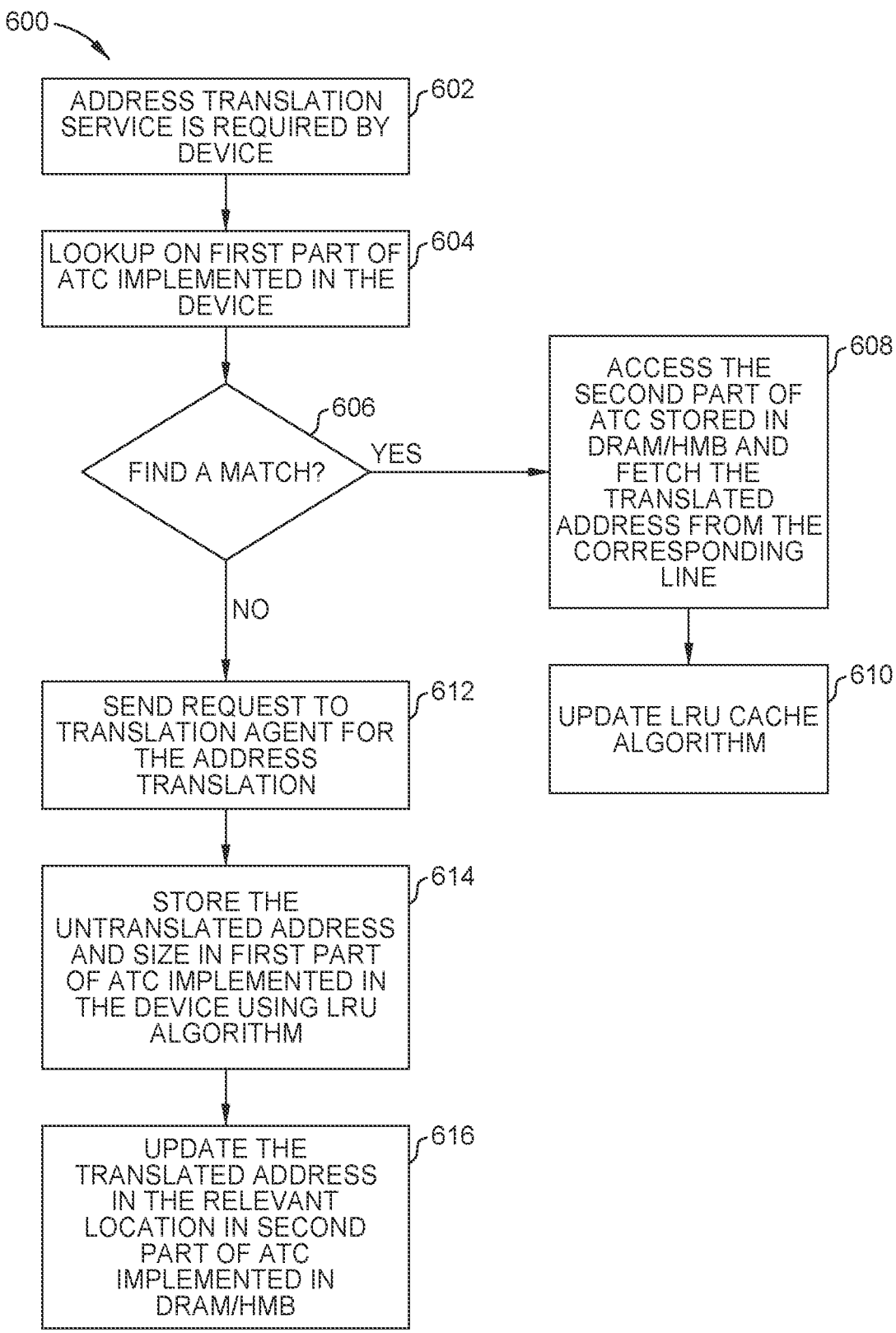
FIG. 6 is a flowchart illustrating an address translation process, according to one embodiment.

FIG. 6 is a flowchart illustrating an address translation process for a hybrid ATC solution 600, according to certain embodiments. At block 602, the device controller receives an ATS request. At block 604, after a request has been received, the device controller performs a look up operation on the first part of the ATC, which is implemented into the device controller. At block 606, the controller determines if there is a stored entry in the first part of the ATC that matches the request by performing a look up operation.

The second part of the ATC is stored in DRAM or HMB and holds corresponding translated addresses. Thus, at block 608, if a match is found in the first part of the ATC then the second part of the ATC is accessed to fetch the translated address from the corresponding line. At block 610, once the translated address has been fetched, the device controller updates the Last Recently Used (LRU) algorithm as part of cache management.

At block 612, if a match is not found in the first part of the ATC, then the device controller sends a request to the TA to get the address translation. At block 614, the device controller will further store the untranslated address and size in the first part of the ATC implemented into the device controller using the LRU algorithm. At block 616, the block will also update the translated address in the corresponding line in the second part of the ATC. Then, the device controller updates the first and second parts of the ATC with the new translated address by evicting another entry.

Figure 7:
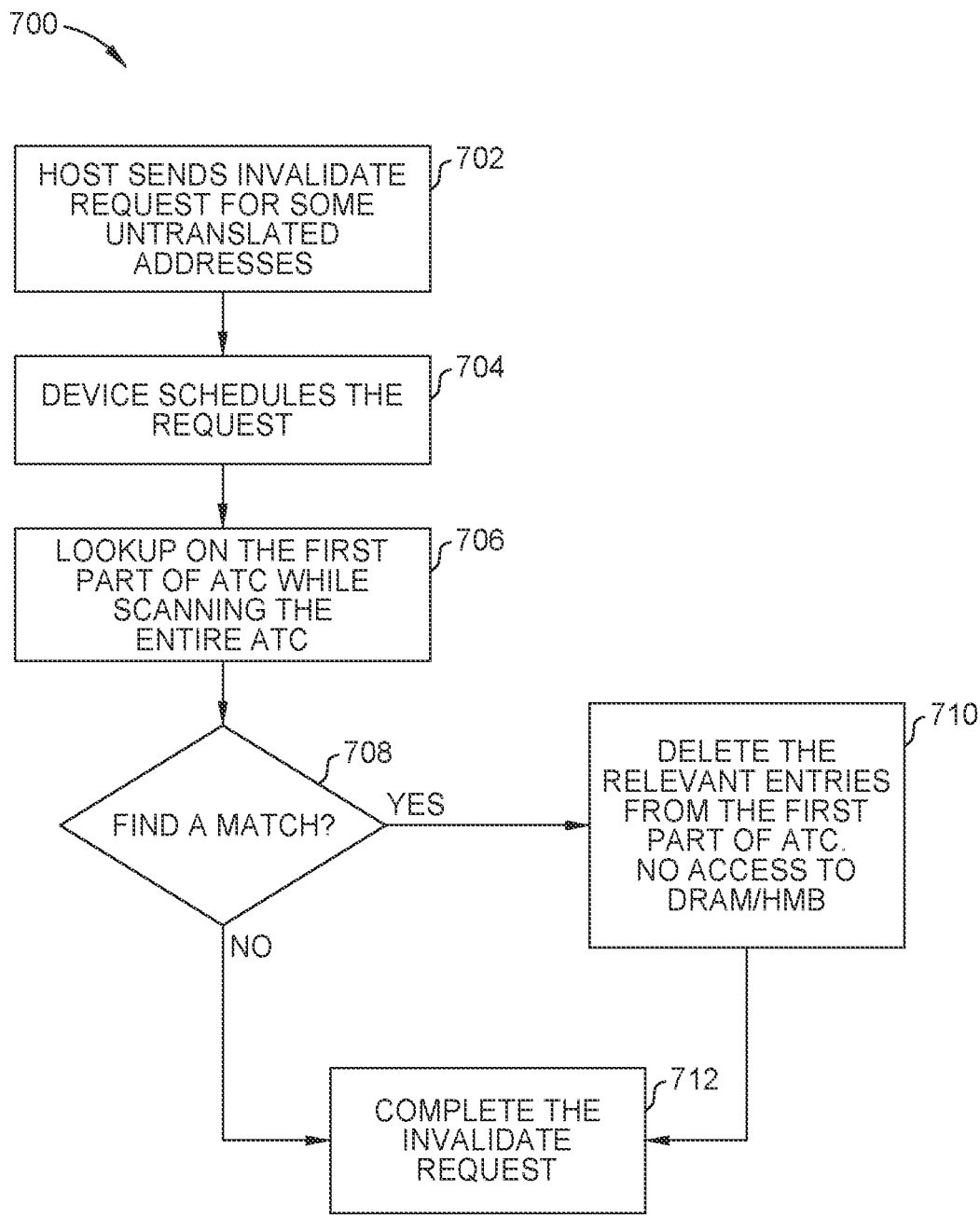
FIG. 7 is a flowchart illustrating an invalidation process, according to another embodiment.

FIG. 7 is a flowchart illustrating an invalidation process for a hybrid ATC solution 700, according to a certain embodiment. The invalidation process is triggered by the host device when the host device needs to remove addresses from the ATC. At block 702, the host device sends an invalidation request for untranslated addresses to the device controller. At block 704, device controller schedules the request and decides when to execute the request. At block 706, the device controller performs a look up operation on the first part of the ATC finding all matches. At block 708, the device controller determines whether any untranslated address stored in the first part of the ATC match the invalidation request. At block 710, if any untranslated addresses stored in the first part of the ATC match the invalidation request, the device controller will delete each relevant entry from the first part of the ATC.

The first part of the ATC validates whether a "hit" scenario occurs. Since the second part of the ATC is accessed only in a "hit" scenario, the second part of the ATC will not be accessed without validation at the first part of the ATC. Accordingly, only the first part of the ATC is accessed to delete entries and the second part of the ATC is not access during the invalidation process. At block 712, once the device controller deletes the relevant entries from the first part of the ATC, the invalidation request is considered complete. Further, at block 708, if the device controller does not find any matches in the first part of the ATC, the invalidation request is considered complete.

Figure 8:
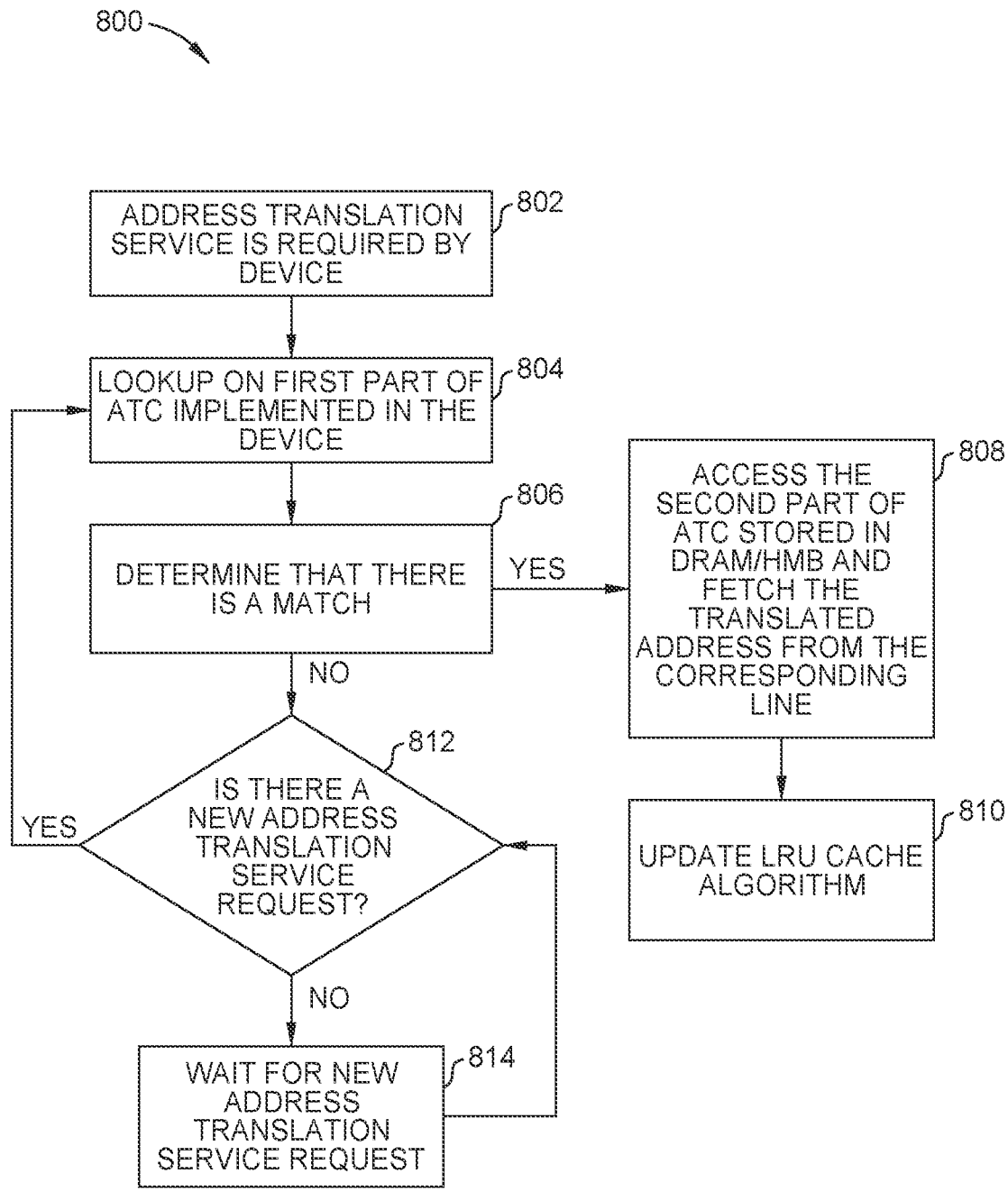
FIG. 8 is a flowchart illustrating an address translation process, according to another embodiment.

FIG. 8 is a flowchart illustrating an address translation process 800, according to certain embodiments. At block 802, the device controller receives an ATS request. At block 804, the device controller performs a look up operation on the first part of the ATC, which is implemented on the device controller. At block 806, the device controller determines that an entry stored in the first part of the ATC matches the ATS request. At block 808, when there is a match, the second part of the ATC, which is stored in DRAM or the HMB, is accessed and the translated address is fetched from the corresponding line. At block 810, the device controller updates the LRU algorithm as part of cache management. At block 812, if the device controller determines no entry in the first part of the ATC matches the ATS request, the device controller will then determine whether there is a new ATS request. At block 814, if there is no new ATS request, the device controller will wait until it receives a new ATS request. When the device controller receives a new ATS request, it will proceed to perform look up operations on the first part of the ATC at block 804.

Figure 9:
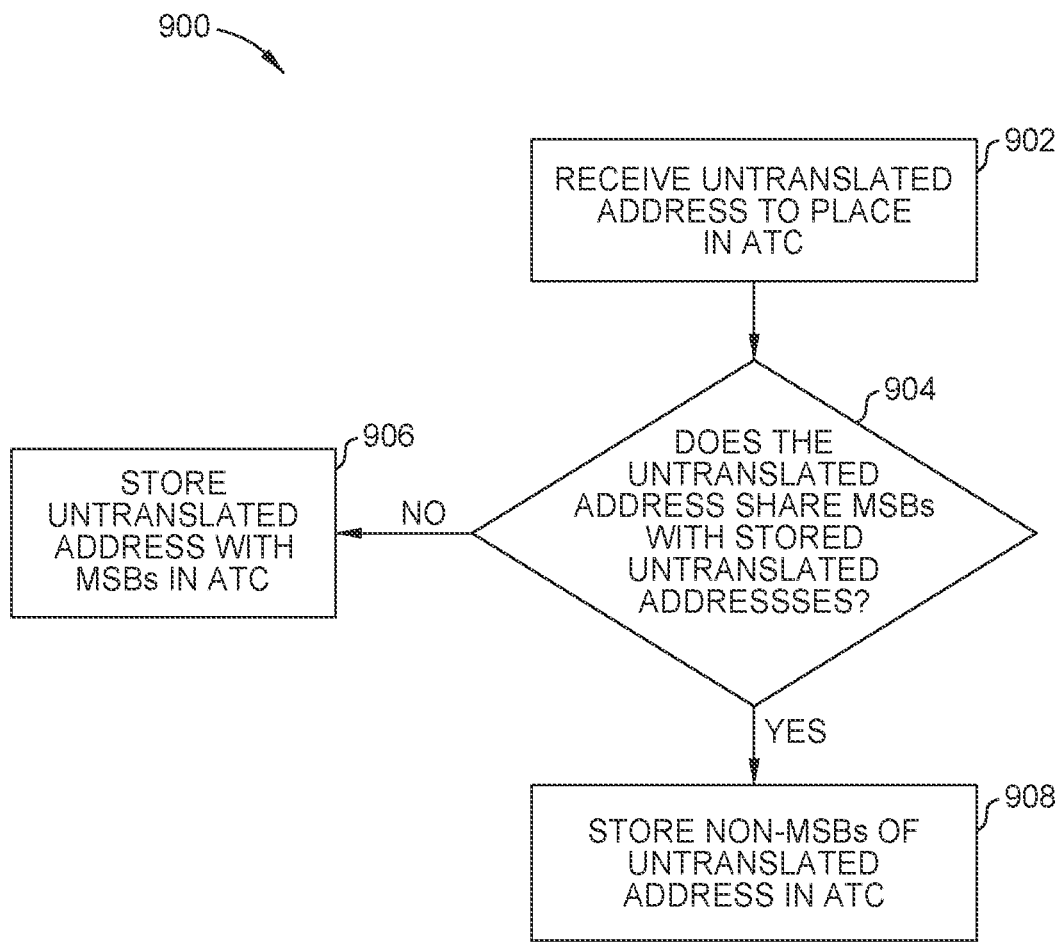
FIG. 9 is a flowchart illustrating a grouping process integrated into an ATS memory device system, according to one embodiment.

FIG. 9 is a flowchart illustrating a grouping process integrated into an ATS memory device system 900, according to one embodiment. The device controller uses the grouping technique to compress untranslated addresses to reduce the size of the ATC. At block 902, the device controller receives an untranslated address to place in the ATC. At block 904, the device controller determines whether the untranslated address share a MSB with stored untranslated addresses. At block 906, if the untranslated address does not share a MSB with stored untranslated addresses, the device controller will store the untranslated address with MSB in the ATC.

At block 908, if the untranslated address share a MSB with stored untranslated addresses, then the device controller will store the non-MSB of the untranslated address in the ATC. For example, an untranslated address is 8 bytes long. Accordingly, if the device controller detects that the four MSBs of the untranslated address are shared while the four least significant bits (LSBs) are different relative to previously stored untranslated addresses then the device controller will only store the four LSBs of the untranslated address in the ATC. In other words, when the device controller detects that the four MSBs of the untranslated address are shared with previously stored untranslated addresses, the device controller will store only the different bits (the four LSBs) of the untranslated address. The result of this grouping technique is a smaller ATC since less bytes are needed.

Figure 10:
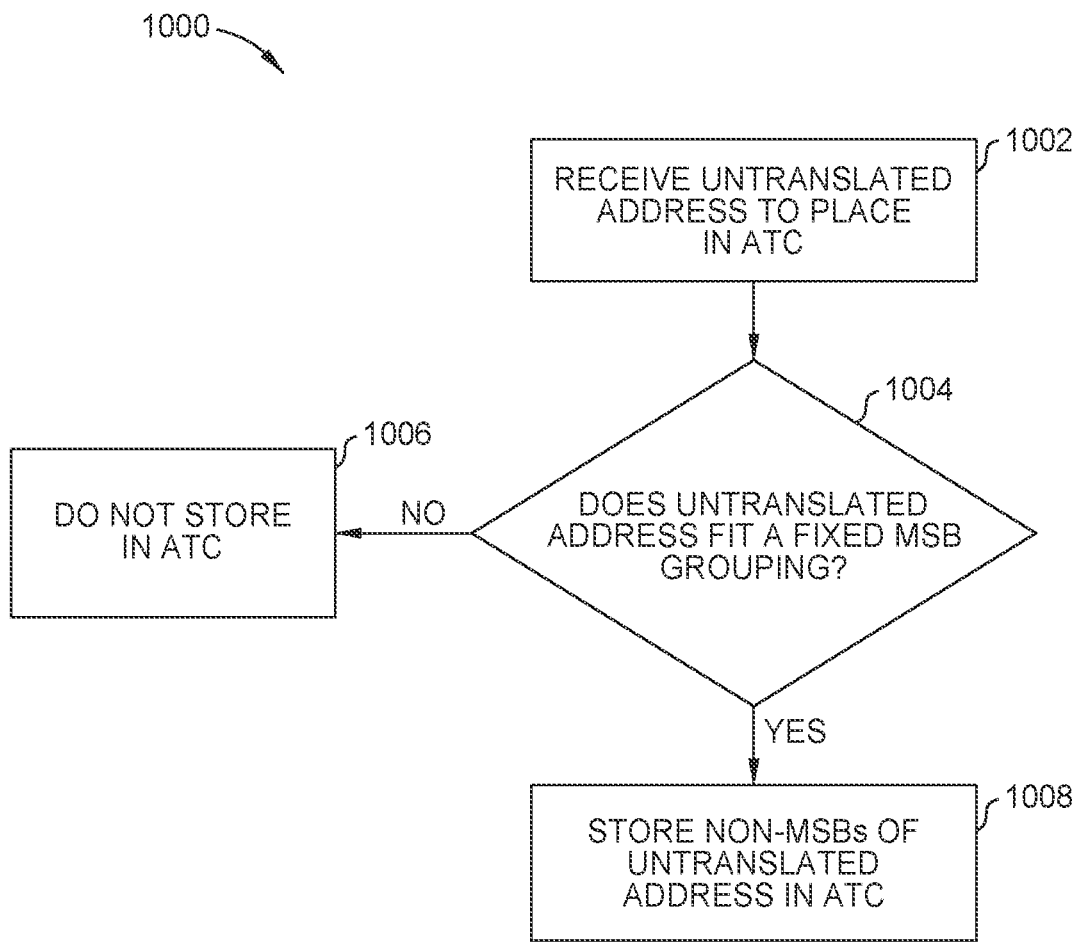
FIG. 10 is a flowchart illustrating a grouping process integrated into an ATS memory device system, according to another embodiment.

FIG. 10 is a flowchart illustrating a grouping process integrated into an ATS memory device system to reduce the size of the ATC 1000, according to a certain embodiment. In this embodiment, the device controller only holds a few sets of fixed four MSBs. However, the sets of fixed four MSBs are configurable. At block 1002, the device controller receives an untranslated address to place in the ATC. At block 1004, the device controller determines if the untranslated address fits a set of the fixed four MSBs. An untranslated address fits a set of the fixed four MSBs when the four MSBs of the untranslated address are shared between one of the sets of fixed four MSBs. At block 1006, if the untranslated address does not fit one of the sets of the fixed four MSBs then then untranslated address is not stored in the ATC. At block 1008, if the untranslated address fits one of the sets of the fixed four MSBs then the device controller will store the non-MSBs (the LSBs) of the untranslated address in the ATC.

By splitting the ATC into two portions, address translation is improved. ATC is very expensive since ATC requires a huge RAM to be used for the cache buffer (in the order of up to several MBs) as well as high performance lookup operations. ATC significantly increases the area, the costs, and the power consumption of the memory device. For example, the improvement is in both costs by not needing as large and expensive first portion and/or location, but maintaining a high enough lookup parallelism to render the split functionally efficient. For example, an ATC with only one portion is typically stored in a fast memory location (e.g., SRAM) which also happens to be expensive. While performance is great, the real estate needed is quite large, which increases costs. If the only one portion is a slower memory (e.g., DRAM), then efficiency is less than optimal even though costs are reduced.

In one embodiment, a data storage device comprises: a memory device; and a controller coupled to the memory device, wherein the controller is configured to: obtain a translation of an untranslated address; store the untranslated address in a first location of an address translation cache (ATC); and store the translated address in a second location of the ATC, wherein the first location is separate and distinct from the second location. The first location is volatile memory. The volatile memory is static random access memory (SRAM). The SRAM is disposed in a host interface module (HIM). The first location and the second location are each volatile memory. The second location is dynamic random access memory (DRAM). The second location is host memory buffer (HMB). The controller is further configured to: determine that ATS is needed; search for the untranslated address in the first location; determine that the untranslated address is in the first location; and retrieve the translated address from the second location. The controller is further configured to: receive an invalidation request to invalidate the untranslated address; search for the untranslated address in the first location; and delete the untranslated address in the first location. The controller is configured to not delete the translated address from the second location in response to the deleting the untranslated address in the first location. The controller is further configured to compress the untranslated address. The controller is further configured to determine whether the untranslated address has one or more most significant byte (MSB) in common with another untranslated address in the ATC.

In another embodiment, a data storage device comprises: a memory device; and a controller coupled to the memory device, wherein the controller is configured to: determine that ATS is needed for an untranslated address; search a first portion of an address translation cache (ATC) for the untranslated address; determine whether there is a match for the untranslated address in the first portion of the ATC; and search a second portion of the ATC for a translated address corresponding to the untranslated address. The first portion is disposed in a first location and the second portion is disposed in a second location, and wherein the first location and the second location are distinct locations. The controller is configured to retrieve the second portion from a host memory buffer (HMB). The controller is configured to retrieve the second portion from the memory device. The controller is configured to delete the untranslated address from the first portion in response to an invalidation request, and wherein the translated address remains in the second portion after the deletion.

In another embodiment, a data storage device comprises: means to store data; and a controller coupled to the means to store data, wherein the controller is configured to: store and retrieve an untranslated address from a first portion of an address translation cache (ATC); and store and retrieve a corresponding translated address from a second portion of the ATC, wherein the first portion and the second portions are distinct locations. Retrieving an untranslated address and retrieving the translated address occur sequentially. The untranslated address is a first untranslated address, wherein the controller is configured to simultaneous retrieve the corresponding translated address and a second untranslated address.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
     obtain a translation corresponding to an untranslated address;
     store the untranslated address in a first location of an address translation cache (ATC);
     retrieve the untranslated address from the first location of the ATC;
     store the translated address in a second location of the ATC, wherein the first location is separate and distinct from the second location; and
     retrieve the translated address corresponding to the untranslated address from the second location of the ATC, wherein retrieving the untranslated address and retrieving the translated address occur sequentially.

2. The data storage device of claim 1, wherein the first location is volatile memory.

3. The data storage device of claim 2, wherein the volatile memory is static random access memory (SRAM).

4. The data storage device of claim 3, wherein the SRAM is disposed in a host interface module (HIM).

5. The data storage device of claim 2, wherein the first location and the second location are each volatile memory.

6. The data storage device of claim 5, wherein the second location is dynamic random access memory (DRAM).

7. The data storage device of claim 2, wherein the second location is host memory buffer (HMB).

8. The data storage device of claim 1, wherein the controller is further configured to:
   determine that address translation service (ATS) is needed;
   search for the untranslated address in the first location;
   determine that the untranslated address is in the first location; and
   retrieve the translated address from the second location.

9. The data storage device of claim 1, wherein the controller is further configured to:
   receive an invalidation request to invalidate the untranslated address;
   search for the untranslated address in the first location; and
   delete the untranslated address in the first location.

10. The data storage device of claim 9, wherein the controller is configured to not delete the translated address from the second location in response to the deleting the untranslated address in the first location.

11. The data storage device of claim 1, wherein the controller is further configured to compress the untranslated address.

12. The data storage device of claim 1, wherein the controller is further configured to determine whether the untranslated address has one or more most significant byte (MSB) in common with another untranslated address in the ATC.

13. A data storage device, comprising:
a memory device; and
a controller coupled to the memory device, wherein the controller is configured to:
- determine that address translation service (ATS) is needed for an untranslated address;
- search a first portion of an address translation cache (ATC) for the untranslated address;
- determine whether there is a match for the untranslated address in the first portion of the ATC;
- retrieve the untranslated address from the first portion of the ATC;
- search a second portion of the ATC for a translated address corresponding to the untranslated address; and
- retrieve the translated address from the second portion of the ATC, wherein retrieving the untranslated address and retrieving the translated address occur sequentially.

14. The data storage device of claim 13, wherein the first portion is disposed in a first location and the second portion is disposed in a second location, and wherein the first location and the second location are distinct locations.

15. The data storage device of claim 13, wherein the controller is configured to retrieve the second portion from a host memory buffer (HMB).

16. The data storage device of claim 13, wherein the controller is configured to retrieve the second portion from the memory device.

17. The data storage device of claim 13, wherein the controller is configured to delete the untranslated address from the first portion in response to an invalidation request, and wherein the translated address remains in the second portion after the deletion.

18. A data storage device, comprising:
means to store data; and
a controller coupled to the means to store data, wherein the controller is configured to:
- store and retrieve an untranslated address from a first portion of an address translation cache (ATC); and
- store and retrieve a corresponding translated address from a second portion of the ATC, wherein the first portion and the second portion are distinct locations, wherein retrieving the untranslated address and retrieving the translated address occur sequentially.

19. A data storage device, comprising:
means to store data; and
a controller coupled to the means to store data, wherein the controller is configured to:
- store and retrieve an untranslated address from a first portion of an address translation cache (ATC); and
- store and retrieve a corresponding translated address from a second portion of the ATC, wherein the first portion and the second portion are distinct locations, wherein the untranslated address is a first untranslated address, wherein the controller is configured to simultaneously retrieve the corresponding translated address and a second untranslated address.

* * * * *